(12) United States Patent
Tang

(10) Patent No.: US 11,270,690 B2
(45) Date of Patent: Mar. 8, 2022

(54) METHOD AND APPARATUS FOR WAKING UP DEVICE

(71) Applicant: Baidu Online Network Technology (Beijing) Co., Ltd., Beijing (CN)

(72) Inventor: Dandan Tang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 177 days.

(21) Appl. No.: 16/665,901

(22) Filed: Oct. 28, 2019

(65) Prior Publication Data

US 2020/0294491 A1 Sep. 17, 2020

(30) Foreign Application Priority Data

Mar. 11, 2019 (CN) .......................... 201910180685.5

(51) Int. Cl.
*G10L 15/22* (2006.01)
*G10L 15/08* (2006.01)
*G10L 15/05* (2013.01)

(52) U.S. Cl.
CPC .............. *G10L 15/08* (2013.01); *G10L 15/05* (2013.01); *G10L 15/22* (2013.01); *G10L 2015/088* (2013.01); *G10L 2015/223* (2013.01)

(58) Field of Classification Search
CPC ... G10L 2015/088; G10L 15/22; G10L 15/30; G10L 2015/223; G10L 15/063; G10L 15/08; G10L 15/18; G10L 15/26; G10L 2015/0631; G10L 25/51; G10L 13/027; G10L 15/02; G10L 15/20; G10L 2015/0638; G10L 15/05; G06F 3/167; G06F 1/3215; G06F 3/04842; G06F 3/14; G06F 40/35
USPC .................... 704/270, 1, 251, 235, 275, 261
See application file for complete search history.

(56) References Cited

U.S. PATENT DOCUMENTS

| | | | |
|---|---|---|---|
| 2008/0168118 A1* | 7/2008 | Hickey | G06F 13/385 709/201 |
| 2009/0063155 A1* | 3/2009 | Chiang | B25J 13/003 704/261 |
| 2009/0083039 A1* | 3/2009 | Chiang | G10L 13/027 704/275 |
| 2009/0132250 A1* | 5/2009 | Chiang | G06F 40/35 704/251 |

(Continued)

FOREIGN PATENT DOCUMENTS

| | | |
|---|---|---|
| CN | 105575395 A | 5/2016 |
| CN | 107203265 A | 9/2017 |

(Continued)

*Primary Examiner* — Vijay B Chawan
(74) *Attorney, Agent, or Firm* — Kilpatrick Townsend & Stockton LLP

(57) ABSTRACT

Embodiments of the present disclosure relate to a method and apparatus for waking up a device. The method may include: collecting an audio signal in an environment the device located therein; determining, in response to that the audio signal includes a custom wake-up word being determined, a response strategy preset by a user and corresponding to the custom wake-up word; determining a target response text based on the response strategy; and generating a response speech of the target response text and playing the response speech.

20 Claims, 6 Drawing Sheets

(56) References Cited

U.S. PATENT DOCUMENTS

| | | | |
|---|---|---|---|
| 2009/0316671 A1* | 12/2009 | Rolf | H04W 4/90 370/338 |
| 2016/0077792 A1* | 3/2016 | Bansal | G06F 1/3215 704/275 |
| 2016/0266910 A1* | 9/2016 | Bansal | G06F 1/28 |
| 2017/0193995 A1* | 7/2017 | Sharifi | G10L 15/063 |
| 2017/0243588 A1* | 8/2017 | Lee | G10L 15/30 |
| 2018/0012593 A1* | 1/2018 | Prasad | G10L 15/18 |
| 2019/0005954 A1* | 1/2019 | Xie | G10L 15/063 |

FOREIGN PATENT DOCUMENTS

| | | |
|---|---|---|
| CN | 107358954 A | 11/2017 |
| CN | 109358751 A | 2/2019 |
| CN | 109448714 A | 3/2019 |
| JP | 2014-106523 A | 6/2014 |
| WO | 2016/103809 A1 | 6/2016 |

* cited by examiner

METHOD AND APPARATUS FOR WAKING UP DEVICE

CROSS-REFERENCE TO RELATED APPLICATIONS

This application claims priority to Chinese Patent Application No. 201910180685.5, filed with the China National Intellectual Property Administration (CNIPA) on Mar. 11, 2019, the contents of which are incorporated herein by reference in its entirety.

TECHNICAL FIELD

Embodiments of the present disclosure relate to the field of computer technology, and specifically to a method and apparatus for waking up a device.

BACKGROUND

With the development of artificial intelligence technology, smart speech devices (e.g., smart speakers, smart phones, smart TVs, etc.) are gradually used by users. A user can interact with a smart terminal device through speech to wake up a smart speech device.

In the existing wake-up schemes, wake-up is usually achieved using wake-up words inherent in the intelligent speech devices.

SUMMARY

Embodiments of the present disclosure provide a method and apparatus for waking up a device.

In a first aspect, an embodiment of the present disclosure provides a method for waking up a device, including: collecting an audio signal in an environment the device located therein; determining, in response to that the audio signal includes a custom wake-up word being determined, a response strategy preset by a user and corresponding to the custom wake-up word; determining a target response text based on the response strategy; and generating a response speech of the target response text and playing the response speech.

In some embodiments, the determining a target response text based on the response strategy includes: in response to the current network connection status being normal, sending the custom wake-up word to a cloud server; and determining a response text received from the cloud server as the target response text.

In some embodiments, the determining a target response text based on the response strategy includes: in response to the current abnormal network connection status being abnormal, determining a target response text matching the custom wake-up word from a preset response text set, or determining the target response text from a historical response text set.

In some embodiments, the determining the target response text from a historical response text set includes: in response to that the historical response text set is empty being determined, determining a preset response text as the target response text.

In some embodiments, the method further includes: receiving a wake-up word setting request sent by the user, the wake-up word setting request including a custom wake-up word; and setting the custom wake-up word as a custom wake-up word of the device.

In some embodiments, the wake-up word setting request further includes a response text; and the determining a target response text based on the response strategy includes: determining the response text in the wake-up word setting request as the target response text.

In a second aspect, an embodiment of the present disclosure provides an apparatus for waking up a device, including: an audio signal collection unit, configured to collect an audio signal in an environment the device located therein; a response strategy determination unit, configured to determine, in response to that the audio signal includes a custom wake-up word being determined, a response strategy preset by a user and corresponding to the custom wake-up word; a response text determination unit, configured to determine a target response text based on the response strategy; and a response speech playback unit, configured to generate a response speech of the target response text and play the response speech.

In some embodiments, the response text determination unit is further configured to: send, in response to the current network connection status being normal, the custom wake-up word to a cloud server; and determine a response text received from the cloud server as the target response text.

In some embodiments, the response text determination unit is further configured to: determine, in response to current network connection status being abnormal, a target response text matching the custom wake-up word from a preset response text set, or determine the target response text from a historical response text set.

In some embodiments, the response text determination unit is further configured to: determine, in response to that the historical response text set is empty being determined, a preset response text as the target response text.

In some embodiments, the apparatus further includes a custom wake-up word setting unit, configured to: receive a wake-up word setting request sent by the user, the wake-up word setting request including a custom wake-up word; and set the custom wake-up word as a custom wake-up word of the device.

In some embodiments, the wake-up word setting request further includes a response text; and the response text determination unit is further configured to: determine the response text in the wake-up word setting request as the target response text.

In a third aspect, an embodiment of the present disclosure provides a terminal device, including: one or more processors; and a storage apparatus storing one or more programs, the one or more programs, when executed by the one or more processors, causing the one or more processors to implement the method described in any embodiment of the first aspect.

In a fourth aspect, an embodiment of the present disclosure provides a computer readable medium storing a computer program, where when the program is executed by a processor, the method described in any embodiment of the first aspect is implemented.

In the method and apparatus for waking up a device according to the above embodiments of the present disclosure, an audio signal in an environment in which the device is located may be collected first. Then, when the audio signal is determined to include a custom wake-up word, a response strategy preset by a user and corresponding to the custom wake-up word is determined. A target response text is determined based on the response strategy. Finally, a response speech of the target response text is generated and played. The method of the embodiments allows the user to set a custom wake-up word and a response speech of the custom wake-up word for a smart device, which enriches the interaction between the user and the smart device.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be further described below in detail in combination with the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with the embodiments.

Figure 1:
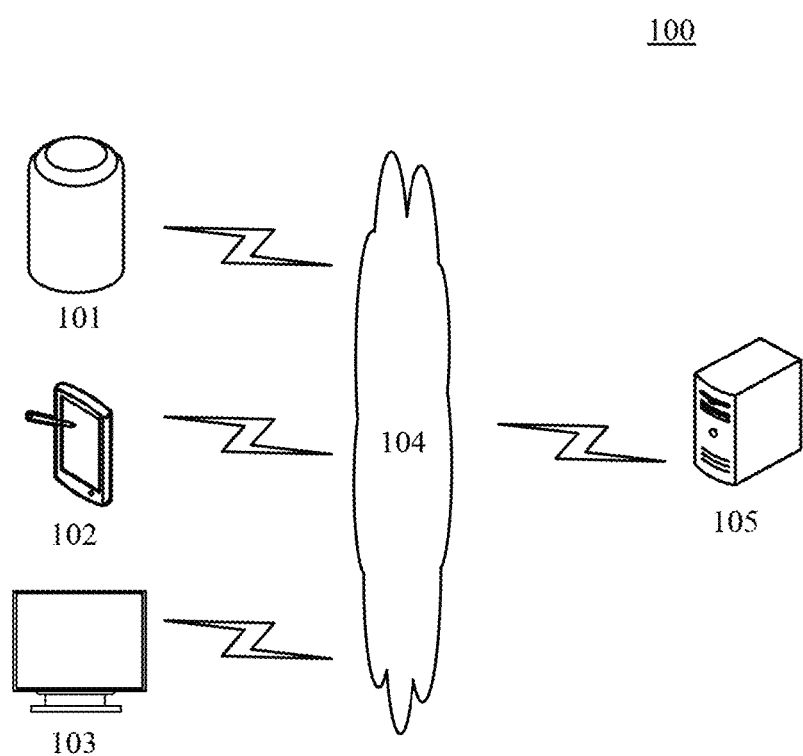
FIG. 1 is an architectural diagram of an example system to which some embodiments of the present disclosure may be applied.

FIG. 1 shows an example system architecture 100 to which an embodiment of a method for waking up a device or an apparatus for waking up a device may be applied.

As shown in FIG. 1, the system architecture 100 may include a terminal device 101, 102 or 103, a network 104, and a server 105. The network 104 serves as a medium providing a communication link between the terminal device 101, 102 or 103 and the server 105. The network 104 may include various types of connections, such as wired or wireless communication links, or optical fiber cables.

A user may interact with the server 105 by using the terminal device 101, 102 or 103 through the network 104 to receive or send messages, etc. Various communication client applications, e.g., audio processing applications, audio playback applications, etc., may be installed in the terminal device 101, 102 or 103.

The terminal device 101, 102 or 103 may be hardware or software. When being hardware, the terminal device 101, 102 or 103 may be various electronic devices with microphones or speakers, including but not limited to a smart speaker, a smart phone, a smart TV, a tablet computer, a laptop computer, a desktop computer, etc. When being software, the terminal device 101, 102 or 103 may be installed in the above-listed electronic devices. The terminal device 101, 102 or 103 may be implemented as a plurality of software programs or software modules (e.g., for providing distributed services), or as a single software program or software module, which is not specifically limited in the present disclosure.

The server 105 may be a server providing various services, for example, a backend server for processing audio signals acquired by the terminal device 101, 102 or 103. The backend server may analyze the received data such as audio signals, and feed the processing result (e.g., a target response text) back to the terminal device 101, 102 or 103.

It should be noted that the server 105 may be hardware or software. When being hardware, the server 105 may be implemented as a distributed server cluster composed of multiple servers, or implemented as a single server. When being software, the server 105 may be implemented as a plurality of software programs or software modules (e.g., for providing distributed services), or as a single software program or software module, which is not specifically limited in the present disclosure.

It should be noted that the method for waking up a device according to some embodiments of the present disclosure is generally performed by the terminal device 101, 102 or 103. Accordingly, the apparatus for waking up a device is generally provided in the terminal device 101, 102 or 103.

It should be understood that the numbers of the terminal devices, the network and the server in FIG. 1 are merely illustrative. Any number of terminal devices, networks and servers may be provided based on actual requirements.

Figure 2:
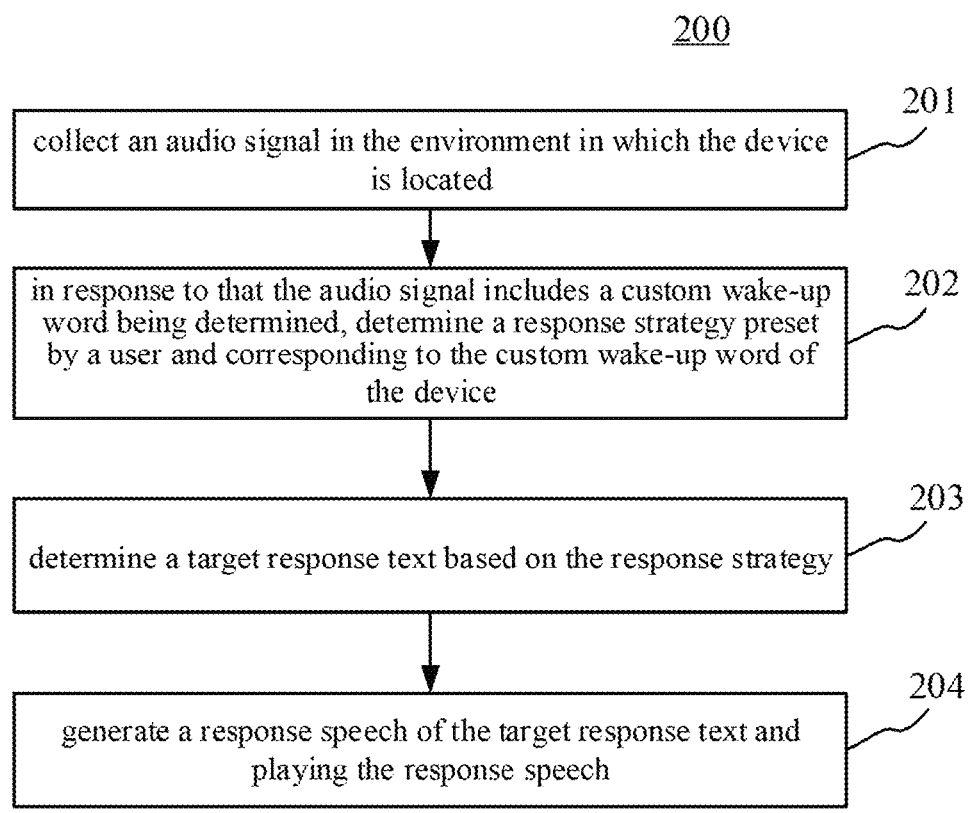
FIG. 2 is a flowchart of a method for waking up a device according to an embodiment of the present disclosure.

Further, referring to FIG. 2, a flow 200 of a method for waking up a device according to an embodiment of the present disclosure is shown. The method for waking up a device in the present embodiment includes.

Step 201: collecting an audio signal in an environment the device located therein.

In the present embodiment, the executing body (e.g., the terminal device 101, 102 or 103 shown in FIG. 1) of the method for waking up a device may collect, by using a microphone or a speaker installed in the device, audio signals in the environment in which the device is located. Then, the acquired audio signals may be analyzed.

Step 202: in response to that the audio signal includes a custom wake-up word being determined, determining a response strategy preset by a user and corresponding to the custom wake-up word.

The executing body may perform speech recognition on the audio signals to determine whether the audio signals include a custom wake-up word. If the audio signals include a custom wake-up word, the executing body may determine the response strategy preset by the user and corresponding to the custom wake-up word. In the present embodiment, the response strategy may include a custom response strategy, a default response strategy, and an automatic response strategy. The custom response strategy includes a custom response text preset by the user and corresponding to the custom wake-up word. The default response strategy includes a default response text of the device. The automatic response strategy may be a response text automatically matched with the custom wake-up word by the executing body or a cloud server connected to the executing body.

Step 203: determining a target response text based on the response strategy.

After determining the response strategy, the executing body may determine a target response text. Specifically, the executing body may determine the response text included in the response strategy as the target response text. For example, when determining that the response strategy is a custom response strategy, the executing body may determine the custom response text included in the custom response strategy as the target response text.

In some optional implementations of the present embodiment, the same custom wake-up word may correspond to a plurality of target response texts.

In this implementation, if the response strategy is an automatic response strategy, different response texts may be matched to the same custom wake-up word. For example, if the custom wake-up word is "Bunny", the corresponding response text may include "Are the teeth brushed?", "We meet again", etc.

Step 204: generating a response speech of the target response text and playing the response speech.

After the target response text is determined, the executing body may generate the response speech of the target response text. Specifically, the executing body may generate the response speech using TTS (Text To Speech) technology. After the response speech is generated, the executing body may also play the response speech in response to the user's custom wake-up word, thereby waking up the device. It can be understood that an audio playback apparatus such as a speaker may be installed or connected to the executing body to play the response speech.

In some optional implementations of the present embodiment, the method may further include the following steps not shown in FIG. 2: receiving a wake-up word setting request sent by a user, the wake-up word setting request including a custom wake-up word; and setting the custom wake-up word as a custom wake-up word of the device.

In this implementation, the executing body may receive a wake-up word setting request sent by the user. The wake-up word setting request may be in the form of speech or text. For example, the user may directly say to the executing body "I want to set Xiaodu as a wake-up word". The executing body may perform speech recognition on the speech, and set "Xiaodu" as a custom wake-up word after the recognition succeeds.

In some optional implementations of the present embodiment, a plurality of custom wake-up words may be included.

In this implementation, the user may send a plurality of wake-up word setting requests multiple times, each wake-up word setting request including a custom wake-up word, to set a plurality of custom wake-up words for the device.

In some optional implementations of the present embodiment, the wake-up word setting request further includes a response text. Then, when determining the target response text, the executing body may directly determine the response text included in the wake-up word setting request as the target response text.

In this implementation, the user may set a custom response text. The custom response text may be sent to the executing body together with the custom wake-up word. After analysis, the executing body may determine the custom response text as the response text of the custom wake-up word.

Figure 3:
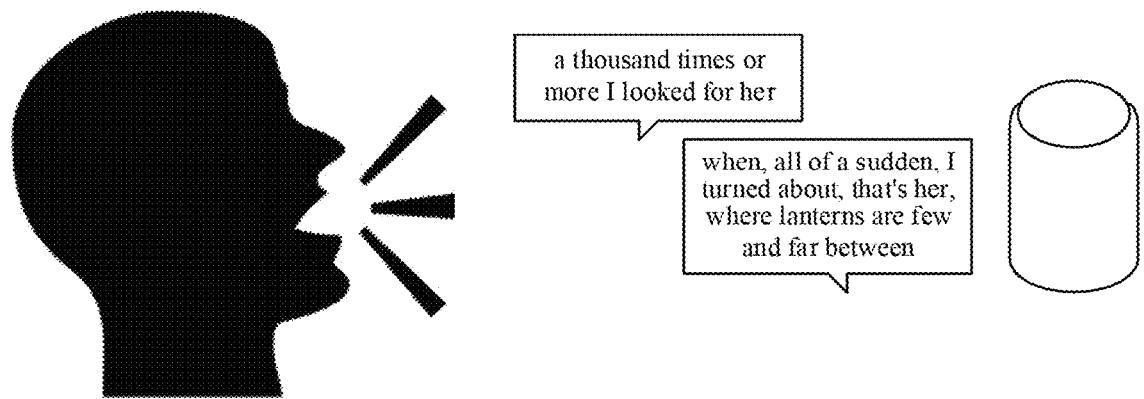
FIG. 3 is a flowchart of an application scenario of the method for waking up a device.

Further refer to FIG. 3, which is a schematic diagram of an application scenario of the method for waking up a device according to the present embodiment. In the application scenario of FIG. 3, the device is a smart speaker. The user presets a custom wake-up word and a custom response text corresponding to the custom wake-up word for the smart device. The custom wake-up word is "a thousand times or more I looked for her (Chinese Poem)", while the custom response text is "when, all of a sudden, I turned about, that's her, where lanterns are few and far between". When the user says the custom wake-up word "thousands times or more I looked for her", the smart speaker plays the response speech "when, all of a sudden, I turned about, that's her, where lanterns are few and far between".

In the existing method for waking up a device, the user is usually allowed to wake up the device by using a wake-up word set by a system. The wake-up word set by the system may be referred to as a main wake-up word. Setting custom wake-up words by users is supported by some devices. However, the wake-up rate of the custom wake-up words is generally lower than that of the main wake-up word. This is because waking a device by a main wake-up word adopts a wake-up model trained by a large amount of data, while the custom wake-up word does not need to be trained by any data. If the main wake-up word is replaced with the custom wake-up word only, the wake-up effect may be poor, the user always faces the situation of "failing to wake up" or "waking up by mistake", which brings negative user experience to the user.

In the method for waking up a device according to the above embodiments of the present disclosure, an audio signal in an environment in which the device is located may be collected first. Then, when the audio signal is determined to include a custom wake-up word, a response strategy preset by a user and corresponding to the custom wake-up word is determined. A target response text is determined according to the response strategy. Finally, a response speech of the target response text is generated and played. The method of the present embodiment allows the user to set a custom wake-up word and a response text of the custom wake-up word, which enriches the interaction between the user and the device, and improves the user's experience of waking-up a device.

Figure 4:
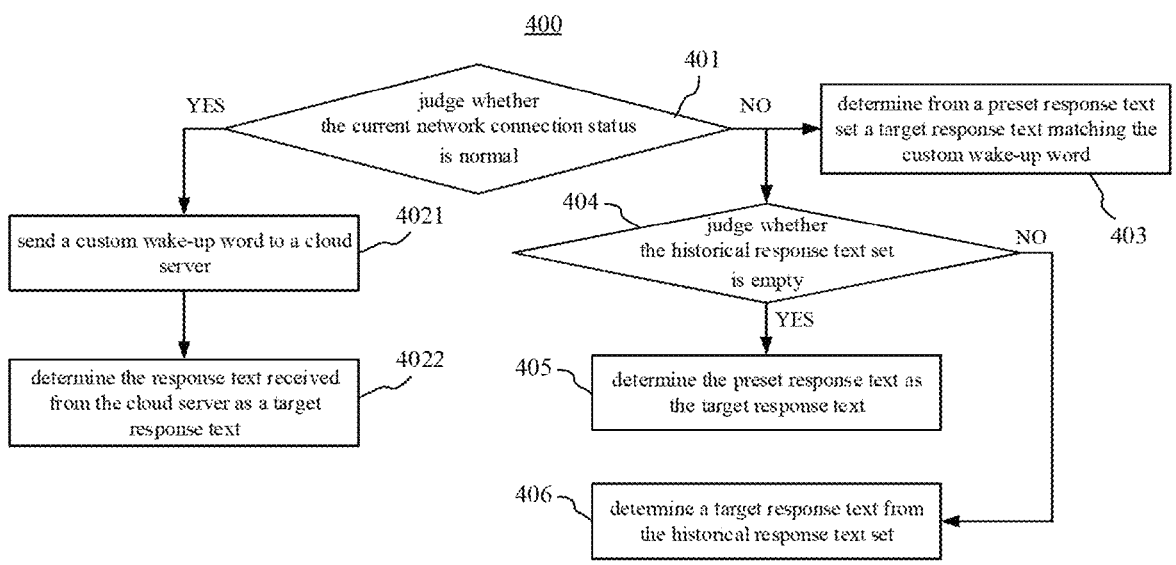
FIG. 4 is a flowchart of determining a target response text in the method for waking up a device according to an embodiment of the present disclosure.

Further, referring to FIG. 4, a flow 400 of a method for waking up a device according to another embodiment the present disclosure is shown. As shown in FIG. 4, the method for waking up a device according to the present embodiment may determine a target response text by the following steps.

Step 401: judging whether the current network connection status is normal.

In the present embodiment, the executing body may first judge whether the current network connection status is normal. If normal, steps 4021 to 4022 are performed, otherwise, step 403 or step 404 is performed. It can be understood that the executing body may judge whether the current network connection status is normal by sending a request to a cloud server. If a response is received from the cloud server within a preset time period, it can be determined that the current network connection status is normal. Otherwise, it is determined that the current network connection status is abnormal.

Step 4021: sending a custom wake-up word to a cloud server.

In response to the current network connection status being normal, the executing body may send a custom wake-up word to the cloud server, so that the cloud server determines a response text based on a poetry database or a current network hot word.

Step 4022: determining the response text received from the cloud server as the target response text.

The executing body may receive a response text from the cloud server and then determine the received response text as the target response text.

Step 403: determining a target response text matching the custom wake-up word from a preset response text set.

In the present embodiment, in response to the current network connection status being abnormal, the executing body may determine from the preset response text set the target response text matching the custom wake-up word.

Here, the preset response text set may include a poetry set, a two-part allegorical saying set, a network hot word set, etc. For example, when the preset response text set is a two-part allegorical saying set, and the custom wake-up word is "sesame flowers on the stem", the corresponding response text may be "rise joint by joint".

Step 404: judging whether a historical response text set is empty.

The executing body may also determine the target response text from the historical response text set. Then, the executing body first needs to judge whether the historical response text set is empty. If empty, step 405 is performed, otherwise, step 406 is performed.

Step 405: determining the preset response text as a target response text.

When the historical response text set is empty, the executing body may determine the preset response text as the target response text. Here, the preset response text may be a default response text of the device.

Step 406: determining a target response text from the historical response text set.

When the historical response text set is not empty, the executing body may determine the target response text from the historical response text set. Specifically, the executing body may select any historical response text from the historical response text set as the target response text.

The method for waking up a device according to the above embodiments of the present disclosure can determine the target response text in various ways, thereby improving the user's experience of waking-up a device.

Figure 5:
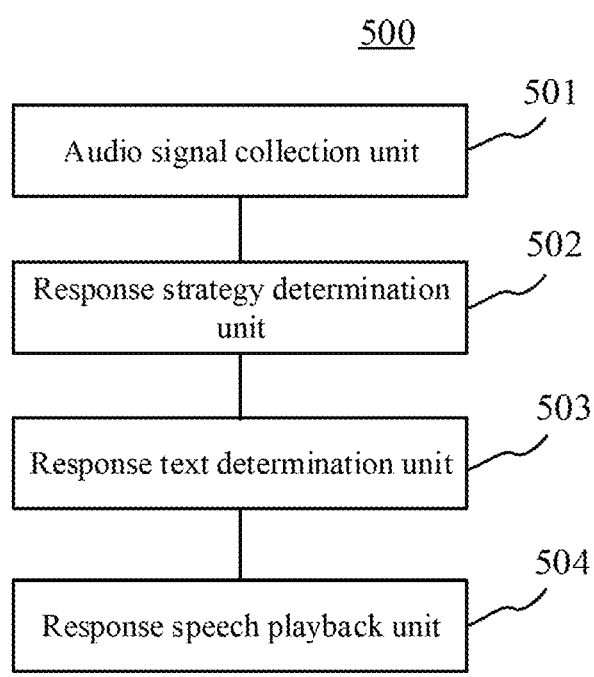
FIG. 5 is a schematic structural diagram of an apparatus for waking up a device according to an embodiment of the present disclosure.

With further reference to FIG. 5, as an implementation of the method shown in the above figures, the present disclosure provides some embodiments of an apparatus for waking up a device. The embodiments of the apparatus corresponds to the embodiments of the method shown in FIG. 2, and the apparatus may be applied to various electronic devices.

As shown in FIG. 5, the apparatus 500 for waking up a device according to the present embodiment includes: an audio signal collection unit 501, a response strategy determination unit 502, a response text determination unit 503, and a response speech playback unit 504.

The audio signal collection unit 501 is configured to collect an audio signal in an environment in which the device is located.

The response strategy determination unit 502 is configured to determine, in response to that the audio signal includes a custom wake-up word being determined, a response strategy preset by a user and corresponding to the custom wake-up word.

The response text determination unit 503 is configured to determine a target response text based on the response strategy.

The response speech playback unit 504 is configured to generate a response speech of the target response text and play the response speech.

In some optional implementations of the present embodiment, the response text determination unit 503 may be further configured to: send, in response to the current network connection status being normal, the custom wake-up word to a cloud server; and determine a response text received from the cloud server as the target response text.

In some optional implementations of the present embodiment, the response text determination unit 503 may be further configured to: determine, in response to current abnormal network connection status being abnormal, a target response text matching the custom wake-up word from a preset response text set, or determine the target response text from a historical response text set.

In some optional implementations of the present embodiment, the response text determination unit 503 may be further configured to: determine, in response to that the historical response text set is empty being determined, a preset response text as the target response text.

In some optional implementations of the present embodiment, the apparatus 500 may further include a custom wake-up word setting unit not shown in FIG. 5, configured to: receive a wake-up word setting request sent by a user, the wake-up word setting request including a custom wake-up word; and set the custom wake-up word as a custom wake-up word of the device.

In some optional implementations of the present embodiment, the wake-up word setting request may further include a response text. The response text determination unit 503 may be further configured to determine the response text in the wake-up word setting request as the target response text.

It should be understood that the units 501 to 504 described in the apparatus 500 for waking up a device respectively correspond to the steps in the method described with reference to FIG. 2. Therefore, the operations and features described for the method for waking up a device are also suitable for the apparatus 500 and the units included therein, and details are not described herein again.

Hereinafter, referring to FIG. 6, a schematic structural diagram of an electronic device (e.g., the terminal device in FIG. 1) 600 adapted to implement some embodiments of the present disclosure is shown. The terminal device in some embodiments of the present disclosure may include, but is not limited to, mobile terminals such as a mobile phone, a notebook computer, a digital broadcast receiver, a PDA (Personal Digital Assistant), a PAD (Tablet Computer), a PMP (Portable Multimedia Player), and a vehicle terminal (e.g., a vehicle navigation terminal), and fixed terminals such as a digital TV and a desktop computer. The terminal device shown in FIG. 6 is merely an example, and should not limit the function and scope of use of the embodiments of the present disclosure.

Figure 6:
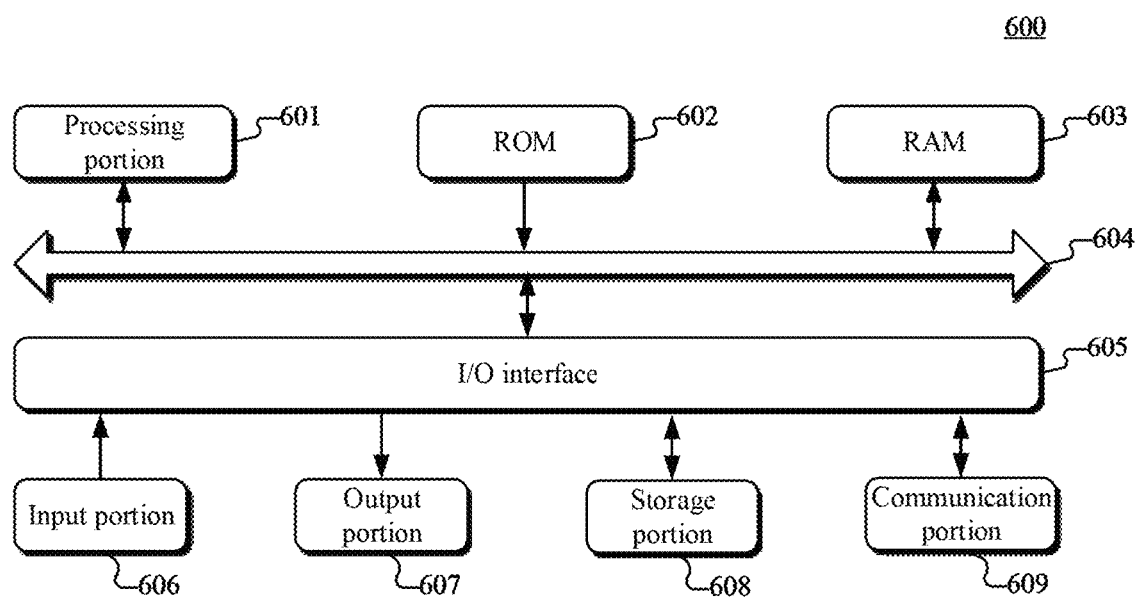
FIG. 6 is a schematic structural diagram of a computer system adapted to implement a terminal device of some embodiments of the present disclosure.

As shown in FIG. 6, the electronic device 600 may include a processing apparatus (e.g., a central processing unit, a Graphics Processing Unit, etc.) 601, which may execute various appropriate operations and processes according to a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602, and the RAM 603 are connected to each other through a bus 604. An input/output (I/O) interface 605 is also connected to the bus 604.

Generally, the following components may be connected to the I/O interface 605: an input portion 606 including, for example, a touch screen, a touch pad, a keyboard, a mouse, a camera, a microphone, an accelerometer, a gyroscope, etc.; an output portion 607 including, for example, a liquid crystal display (LCD), a speaker, a vibrator, etc.; a storage apparatus 608 including, for example, a magnetic tape, a hard disk, etc.; and a communication portion 609. The communication portion 609 may allow wireless or wired communication between the electronic device 600 and other device to exchange data. Although FIG. 6 illustrates the electronic device 600 having various portions, it should be understood that all the illustrated portions are not required to be implemented or included. More or less portions may be alternatively implemented or included. Each block shown in FIG. 6 may represent one portions or a plurality of portions as required.

In particular, according to some embodiments of the present disclosure, the process described above with reference to the flowchart may be implemented in a computer software program. For example, an embodiment of the present disclosure includes a computer program product including a computer program loaded to a computer readable medium, the computer program including a program code for executing the method shown in the flowchart. In such an embodiment, the computer program may be downloaded and installed from a network via the communication portion 609, or installed from the storage apparatus 608, or installed from the ROM 602. The computer program, when executed by the processing apparatus 601, implements the above functions defined in the method of the embodiments of the present disclosure. It should be noted that the computer readable medium of the embodiments of the present disclosure may be a computer readable signal medium or a computer readable storage medium or a combination of the two. An example of the computer readable storage medium may be, but is not limited to: electric, magnetic, optical, electromagnetic, infrared, or semiconductor systems, apparatuses, elements, or any combination of the above. A more specific example of the computer readable storage medium may include but is not limited to: an electrical connection with one or more wires, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory, or any suitable combination of the above. In the embodiments of the present disclosure, the computer readable storage medium may be any tangible medium containing or storing programs which may be used by an instruction execution system, apparatus or device or incorporated thereto. In the embodiments of the present disclosure, the computer readable signal medium may include data signals in base bands or propagated as part of carriers, in which computer readable program codes are carried. The propagated data signals may be in various forms, including but not limited to: electromagnetic signals, optical signals or any suitable combination of the above. The computer readable signal medium may also be any computer readable medium except the computer readable storage medium. The computer readable signal medium is capable of sending, propagating or transmitting a program used by an instruction execution system, apparatus or device or a combination of them. The program codes included in the computer readable medium may be transmitted by any appropriate medium, including but not limited to a wire, an optical cable, RF (Radio Frequency), etc., or any appropriate combination of them.

The computer readable medium may be included in the electronic device, or exists alone and is not assembled into the electronic device. The computer readable medium carries one or more programs. The one or more programs, when executed by the electronic device, cause the electronic device to: collect an audio signal in an environment the device located therein; determine, in response to that the audio signal includes a custom wake-up word being determined, a response strategy preset by a user and corresponding to the custom wake-up word; determine a target response text based on the response strategy; and generate a response speech of the target response text and play the response speech.

Computer program codes for executing operations in the embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program codes may be completely executed on a user's computer, partially executed on a user's computer, executed as a separate software package, partially executed on a user's computer and partially executed on a remote computer, or completely executed on a remote computer or a server. In the circumstance involving a remote computer, the remote computer may be connected to a user's computer through any network, including a local area network (LAN) or a wide area network (WAN), or connected to an external computer (for example, connected through Internet using an Internet service provider).

The flowcharts and block diagrams in the drawings illustrate system architectures, functions and operations that may be implemented according to the systems, methods and computer program products of various embodiments of the present disclosure. In this regard, each box in the flowcharts or block diagrams may represent a module, a program segment, or a part of a code, which includes one or more executable instructions for implementing the specified logical functions. It should be noted that, in some alternative implementations, the functions marked in the boxes may also be implemented in an order different from that marked in the drawing. For example, two consecutive boxes substantially may be executed in parallel, or sometimes executed in a reverse order, depending on the involved functions. It should also be noted that, each box in the block diagrams and/or flowcharts, and a combination of boxes in the block diagrams and/or flowcharts may be implemented by a dedicated hardware-based system for executing specified functions or operations, or implemented by a combination of dedicated hardware and computer instructions.

The units described in the embodiments of the present disclosure may be implemented by software or hardware. The units described may also be set in a processor, for example, described as a processor includes an audio signal acquisition unit, a response strategy determination unit, a response text determination unit, and a response speech playback unit. The names of these units do not constitute limitations to such units themselves in some cases. For example, the audio signal acquisition unit may also be described as "a unit for collecting an audio signal in an environment the device located therein".

The above description only provides an explanation of the preferred embodiments of the present disclosure and the technical principles used. It should be appreciated by those skilled in the art that the inventive scope of the embodiments of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical solutions formed by the above-described features being interchanged with, but not limited to, technical features with similar functions disclosed in the embodiments of the present disclosure are examples.

What is claimed is:

1. A method for waking up a device, comprising:
    collecting an audio signal in an environment the device located therein;
    in response to determining that the audio signal comprises a custom wake-up word of the device, determining a response strategy for the device to respond to the custom wake-up word of the device, wherein the response strategy includes a custom response strategy, and the custom response strategy includes a custom response text preset by a user;
    determining a target response text based on the determined response strategy, comprising: determining the custom response text included in the custom response strategy as the target response text; and
    generating a response speech of the target response text and playing the response speech.

2. The method according to claim 1, wherein the determining of the target response text based on the determined response strategy comprises:
    in response to current network connection status being normal, sending the custom wake-up word to a cloud server; and
    determining a response text received from the cloud server as the target response text.

3. The method according to claim 2, wherein the method further comprises:
    receiving a wake-up word setting request sent by the user, the wake-up word setting request comprising a new custom wake-up word; and
    setting the new custom wake-up word as the custom wake-up word of the device.

4. The method according to claim 1, wherein the determining of the target response text based on the determined response strategy comprises:
    in response to current network connection status being abnormal, determining the target response text matching the custom wake-up word from a preset response text set, or determining the target response text from a historical response text set.

5. The method according to claim 4, wherein the method further comprises:
    receiving a wake-up word setting request sent by the user, the wake-up word setting request comprising a new custom wake-up word; and
    setting the custom wake-up word as the custom wake-up word of the device.

6. The method according to claim 4, wherein the determining of the target response text from the historical response text set comprises:
    in response to determining that the historical response text set is empty, determining a preset response text as the target response text.

7. The method according to claim 1, wherein the method further comprises:
    receiving a wake-up word setting request sent by the user, the wake-up word setting request comprising a new custom wake-up word; and
    setting the custom wake-up word as the custom wake-up word of the device.

8. The method according to claim 7, wherein the wake-up word setting request further comprises a response text, and wherein the determining the target response text based on the response strategy comprises:
    determining the response text in the wake-up word setting request as the target response text.

9. An apparatus for waking up a device, comprising:
    at least one processor; and
    a memory storing instructions, wherein the instructions, when executed by the at least one processor, cause the at least one processor to perform operations, the operations comprising:
        collecting an audio signal in an environment the device located therein;
        in response to determining that the audio signal comprises a custom wake-up word of the device, determining a response strategy for the device to respond preset by a user and corresponding to the custom wake-up word of the device, wherein the response strategy includes a custom response strategy, and the custom response strategy includes a custom response text preset by a user;
        determining a target response text based on the determined response strategy, comprising: determining the custom response text included in the custom response strategy as the target response text; and
        generating a response speech of the target response text and play the response speech.

10. The apparatus according to claim 9, wherein the determining of the target response text based on the determined response strategy comprises:
    in response to current network connection status being normal, sending the custom wake-up word to a cloud server; and
    determining a response text received from the cloud server as the target response text.

11. The apparatus according to claim 9, wherein the determining of the target response text based on the response strategy comprises:
    in response to current abnormal network connection status being abnormal, determining the target response text matching the custom wake-up word from a preset response text set, or determine the target response text from a historical response text set.

12. The apparatus according to claim 11, wherein the determining the target response text from the determined historical response text set comprises:
    in response to determining that the historical response text set is empty, determining a preset response text as the target response text.

13. The apparatus according to claim 9, wherein the operations further comprise:
    receiving a wake-up word setting request sent by the user, the wake-up word setting request comprising a new custom wake-up word; and
    set the custom wake-up word as the custom wake-up word of the device.

14. The apparatus according to claim 13, wherein the wake-up word setting request further comprises a response text; and
    the determining the target response text based on the response strategy comprises:
    determining the response text in the wake-up word setting request as the target response text.

15. A non-transitory computer readable medium storing a computer program, wherein the computer program, when executed by a processor, causes the processor to perform operations, the operations comprising:
    collecting an audio signal in an environment where a device is located therein;
    in response to determining that the audio signal comprises a custom wake-up word of the device, determining a response strategy for the device to respond to the custom wake-up word of the device, wherein the response strategy includes a custom response strategy, and the custom response strategy includes a custom response text preset by a user;

determining a target response text based on the determined response strategy, comprising: determining the custom response text included in the custom response strategy as the target response text; and generating a response speech of the target response text and playing the response speech.

16. The non-transitory computer readable medium according to claim 15, wherein the determining of the target response text based on the determined response strategy comprises:

in response to current network connection status being normal, sending the custom wake-up word to a cloud server; and determining a response text received from the cloud server as the target response text.

17. The non-transitory computer readable medium according to claim 15, wherein the determining of the target response text based on the response strategy comprises:

in response to current network connection status being abnormal, determining the target response text matching the custom wake-up word from a preset response text set, or determining the target response text from a historical response text set.

18. The non-transitory computer readable medium according to claim 17, wherein the determining the target response text from the historical response text set comprises:

in response determining to that the historical response text set is empty, determining a preset response text as the target response text.

19. The non-transitory computer readable medium according to claim 15, wherein the operations further comprise:

receiving a wake-up word setting request sent by the user, the wake-up word setting request comprising a new custom wake-up word; and setting the custom wake-up word as the custom wake-up word of the device.

20. The non-transitory computer readable medium according to claim 19, wherein the wake-up word setting request further comprises a response text; and the determining the target response text based on the response strategy comprises:

determining the response text in the wake-up word setting request as the target response text.

* * * * *